United States Patent
Rivera

(10) Patent No.: US 11,627,827 B2
(45) Date of Patent: *Apr. 18, 2023

(54) BEVERAGE BREWER

(71) Applicant: Adrian Rivera, Whittier, CA (US)

(72) Inventor: Adrian Rivera, Whittier, CA (US)

(*) Notice: Subject to any disclaimer, the term of this patent is extended or adjusted under 35 U.S.C. 154(b) by 28 days.

This patent is subject to a terminal disclaimer.

(21) Appl. No.: 17/326,512

(22) Filed: May 21, 2021

(65) Prior Publication Data

US 2022/0007878 A1 Jan. 13, 2022

Related U.S. Application Data

(63) Continuation-in-part of application No. 16/669,142, filed on Oct. 30, 2019, now Pat. No. 11,064,836, which is a continuation-in-part of application No. 15/702,727, filed on Sep. 12, 2017, now Pat. No. 10,575,672.

(51) Int. Cl.
*A47J 31/20* (2006.01)
*A47J 31/06* (2006.01)

(52) U.S. Cl.
CPC ........... *A47J 31/20* (2013.01); *A47J 31/0615* (2013.01)

(58) Field of Classification Search
CPC .............................. A47J 31/20; A47J 31/0615
See application file for complete search history.

(56) References Cited

U.S. PATENT DOCUMENTS

| | | | |
|---|---|---|---|
| 1,648,983 A | 11/1927 | Elrod | |
| 1,887,848 A | 11/1932 | Peirce | |
| 1,984,047 A | 12/1934 | Thieme | |
| 2,858,762 A | 11/1958 | Wade | |
| 5,265,517 A | 11/1993 | Gilbert | |
| 5,472,719 A | 12/1995 | Favre | |
| 5,957,035 A | 9/1999 | Richter | |
| 6,272,974 B1 | 8/2001 | Pascotti et al. | |
| 7,322,274 B2 | 1/2008 | Wang | |
| 7,353,751 B2 | 4/2008 | Takizawa | |
| 8,857,317 B2 | 10/2014 | Manser et al. | |
| 10,575,672 B2 * | 3/2020 | Rivera | A47J 31/20 |
| 11,000,145 B2 * | 5/2021 | Ballezzi | A47J 31/002 |
| 11,064,836 B2 * | 7/2021 | Rivera | A47J 31/4407 |

(Continued)

FOREIGN PATENT DOCUMENTS

| | | |
|---|---|---|
| CN | 103356068 A | 10/2013 |
| DE | 4302899 A1 | 3/1994 |

(Continued)

*Primary Examiner* — Anthony J Weier

(74) *Attorney, Agent, or Firm* — IP Strategies

(57) ABSTRACT

A beverage brewer includes a container, a container collar, a brewing material holder, a mesh element, and a drive assembly. The container has an open top, a closed sidewall, and a closed bottom. The container collar is configured to cover a rim of the open top. The brewing material holder is configured to hold brewing material and to be suspended from the container collar and into an interior of the container. The brewing material holder includes a sidewall having an opening, an open top, and a bottom. The mesh element covers the opening in the sidewall of the brewing material holder. The drive assembly is positionable on the container collar and is configured to be mechanically coupled to and rotate the brewing material holder.

42 Claims, 7 Drawing Sheets

(56) References Cited

U.S. PATENT DOCUMENTS

| | | |
|---|---|---|
| 2007/0056447 A1 | 3/2007 | Swartz et al. |
| 2007/0079708 A1* | 4/2007 | Li .......................... A47J 31/22 |
| | | 99/279 |
| 2009/0280219 A1 | 11/2009 | Yoakim et al. |
| 2014/0202338 A1 | 7/2014 | Remo et al. |
| 2015/0099045 A1 | 4/2015 | Perentes et al. |
| 2015/0327718 A1 | 11/2015 | Burrows |
| 2016/0367072 A1 | 12/2016 | Boone et al. |
| 2017/0332824 A1 | 11/2017 | Ballezzi |
| 2019/0059634 A1 | 2/2019 | Jacobs |
| 2021/0235918 A1* | 8/2021 | Chen .......................... A23F 5/26 |

FOREIGN PATENT DOCUMENTS

| | | |
|---|---|---|
| EP | 2119383 A1 | 11/2009 |
| EP | 2133008 A1 | 12/2009 |
| WO | 2013160269 A1 | 10/2013 |

\* cited by examiner

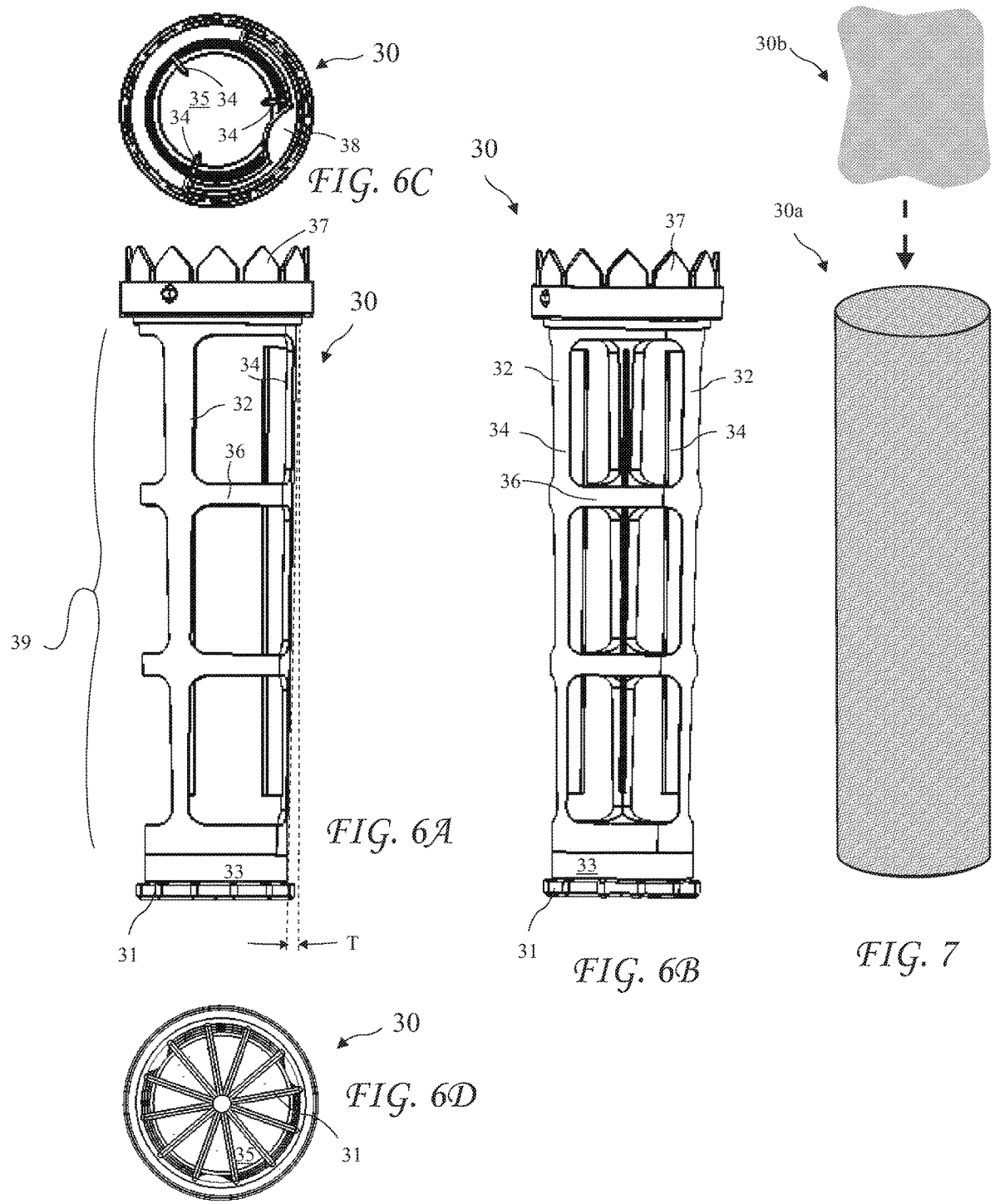

BEVERAGE BREWER

CROSS-REFERENCE TO RELATED APPLICATIONS

This is a continuation-in-part of U.S. patent application Ser. No. 16/669,142, which was filed on Oct. 30, 2019, now U.S. Pat. No. 11,064,836, which in, turn is a continuation-in-part of U.S. patent application Ser. No. 15/702,727, which was filed on Sep. 12, 2017, now U.S. Pat. No. 10,575,672, the entire disclosures of which are incorporated herein by this reference.

FIELD OF THE INVENTION

The invention relates to beverage brewing and in particular to a brewing device for hot or cold brewing of beverages, having a brewing material holder that rotates or otherwise agitates during the brewing process.

BACKGROUND OF THE INVENTION

Several types of beverages, such as coffee, tea, and herbal drinks, are brewed by infusing or steeping ground or shredded brewing material in water or other liquid. For quick brewing, hot water is typically used. However, cold brewing, that is, infusion of the brewing material in cold or room-temperature water rather than in hot water, is sometimes preferred. For example, some coffee drinkers prefer the flavor provided by cold brewing, and bitterness and acidity can be avoided when brewing certain teas by steeping in unheated water rather than hot water. Such cold brewing is accomplished by submerging a portion of brewing material in unheated water for a period of time to allow the brewing material to infuse the water. While the steeping process may provide a desired result, the time required for cold brewing is longer than that required for brewing in hot water.

Conventional cold-brew steeps require a user to measure and pour an amount of brewing material into the steep liquid. A pre-measured simple drop-in portion of brewing material would be convenient, particularly for use in a brewer that simplifies removal of the brewing material and clean-up of the brewer. A brewer that can be used for both hot- and cold-brewing would provide flexibility, and it would be advantageous if the brewer would be configured to speed the cold-brewing process. The ability to use either loose beverage brewing material or pre-packaged brewing material in a capsule or other container would make such a brewer universally useful.

It would also be advantageous to provide a feature by which the brewing time is reduced when the beverage is cold-brewed. Many people prefer the taste of a cold-brewed beverage, but cold-brewing typically takes a much longer time than does traditional hot-brewing. Adding an agitation or rotation feature to the cold brewer can reduce the cold-brewing time. Another manner of speeding the process would be to increase the flow of brewing liquid through the brewing material. Some conventional devices use a gravity feed to draw water through the brewing material using a percolator-type action, which speeds brewing time somewhat. However, these systems tend to have a motorized system outside the brewing container to provide the gravity action, resulting in a brewer having a large footprint that takes up considerable counter space. Also, the complexity of these systems makes them difficult to clean properly and exposes users to potential build-up of bacteria and other contaminants that affect the taste of the beverage and the health of the user. Other systems use a separate container to store and provide the water to be used to brew the beverage, adding size and complexity to the device.

Therefore, a reliable, rapid cold-brewing system that uses a moving brewing material holder to increase the fluid flow would provide an overall improved brewing experience. It would also be advantageous if such a system could be configured as a compact unit, preferably a unit that could be portable. Flexibility would be provided if the brewing system can also be used to hot-brew a beverage. Such a system that uses the beverage serving vessel as the source of the fluid used to brew the beverage would make the unit more compact and simple to use and clean.

BRIEF SUMMARY OF THE INVENTION

According to an aspect of the invention, a beverage brewer includes a container, a container collar, a brewing material holder, a mesh element, and a drive assembly. The container has an open top, a closed sidewall, and a closed bottom. The container collar is configured to cover a rim of the open top. The brewing material holder is configured to hold brewing material and to be suspended from the container collar and into an interior of the container. The brewing material holder includes a sidewall having an opening, an open top, and a bottom. The mesh element covers the opening in the sidewall of the brewing material holder. The drive assembly is positionable on the container collar and is configured to be mechanically coupled to and rotate the brewing material holder.

The open top of the brewing material holder can open into the open top of the container through the container collar when the brewing material holder is suspended from the container collar into the interior of the container.

The bottom of the brewing material holder can have a closed surface.

The bottom of the brewing material holder can be a bottom cap having a closed surface and configured to be removably coupled to a bottom of the sidewall of the brewing material holder.

The drive assembly can include an electric motor. The drive assembly can include reduction gears.

The brewing material holder can include first cooperative elements, and the drive assembly can include second cooperative elements configured to align and engage the first cooperative elements to mechanically couple the drive assembly to the brewing material holder. For example, the first cooperative elements can include teeth, and the second cooperative elements can include a corresponding coupler having spaced bars configured to align and engage the teeth to mechanically couple the drive assembly to the brewing material holder. The teeth can be, for example, generally triangular in shape.

The drive assembly can be configured to rotate the brewing material holder such that the brewing material holder oscillates.

The container can be made from a transparent material.

The mesh element can be constructed from a material that is selected from the group consisting of nylon mesh, metal mesh, paper mesh, and filter paper.

The brewing material holder sidewall can have a circular cross-section and can include a frame having longitudinal members and connecting circumferential members.

The mesh element can be a first mesh element, and the brewing material holder bottom can include an opening covered by a second mesh element.

The brewing material holder can include a blade projecting inward from an inner surface of the sidewall within an interior of the brewing material holder.

The brewing material holder can include a fin extending outward from an exterior surface of the sidewall. For example, the fin can extend outward from an exterior surface of a bottom end of the sidewall.

According to another aspect of the invention, a beverage brewer includes container means for holding liquid, having an open top, a closed sidewall, and a closed bottom; collar means for covering a rim of the open top; holding means for holding ground brewing material and for being suspended from the collar means and into an interior of the container means, wherein the holding means includes a sidewall having an opening, an open top, and a bottom; mesh means for covering an opening in the sidewall of the holding means; and drive means for mechanically coupling to and rotating the holding means, positionable on the collar means.

The open top of the holding means can open into the open top of the container means through the collar means when the holding means is suspended from the collar means into the interior of the container means.

The drive means can include an electric motor.

According to another aspect of the invention, a beverage brewer includes a container collar, a brewing material holder, and a drive assembly. The container collar is configured to be arranged on a rim of an open top of a container. The brewing material holder is configured to hold brewing material and to be suspended from the container collar such that the brewing material holder opens through the container collar. The brewing material holder includes a sidewall having an opening, a mesh element covering the opening, an open top, and a bottom. The drive assembly is positionable on the container collar and is configured to be mechanically coupled to and impart movement to the brewing material holder.

The beverage brewer can also include a container configured to hold liquid, having an open top, a closed sidewall, and a closed bottom. The brewing material holder can be configured to be suspended from the container collar and into an interior of the container such that the brewing material holder opens into the open top of the container through the container collar.

The drive assembly can include an electric motor, and reduction gears.

The drive assembly can be configured to agitate the brewing material holder.

The drive assembly can be configured to rotate the brewing material holder about an axis.

The drive assembly can be configured to oscilllate the brewing material holder.

The brewing material holder can include first cooperative elements, and the drive assembly can include second cooperative elements configured to align and engage the first cooperative elements to mechanically couple the drive assembly to the brewing material holder. For example, the first cooperative elements can include teeth or spaced bars, and the second cooperative elements can include a corresponding coupler having mating spaced bars or teeth configured to align and engage the teeth or spaced bars to mechanically couple the drive assembly to the brewing material holder. The teeth can be, for example, generally triangular in shape.

The mesh element can be constructed from a material such as nylon mesh, metal mesh, paper mesh, and filter paper.

The brewing material holder sidewall can have a circular cross-section and can include a frame having longitudinal members and connecting circumferential members.

The brewing material holder bottom can include an opening covered by another mesh element. Alternatively, the bottom of the brewing material holder can have an entirely closed surface. The bottom of the brewing material holder can be a bottom cap having a closed surface and configured to be removably coupled to a bottom of the sidewall of the brewing material holder.

The brewing material holder can include a paddle blade projecting inward from an inner surface of the sidewall within an interior of the brewing material holder.

The brewing material holder can include a fin extending outward from an exterior surface of the sidewall. For example, the fin can extend outward from an exterior surface of a bottom end of the sidewall.

The beverage brewer can also include control circuitry configured to control the drive assembly to provide selectable movement to the brewing material holder. The beverage brewer can also include a user interface configured to allow user input to the control circuitry.

BRIEF DESCRIPTION OF THE DRAWINGS

FIG. 6A shows a side view of an exemplary brewing material holder according to the invention.

FIG. 6B shows a side view of an exemplary brewing material holder according to the invention.

FIG. 6C shows a top view of an exemplary brewing material holder according to the invention.

FIG. 6D shows a bottom view of an exemplary brewing material holder according to the invention.

FIG. 7 shows exemplary mesh material according to the invention.

Corresponding reference characters indicate corresponding components throughout the drawings.

DETAILED DESCRIPTION OF THE INVENTION

Figure 1A:
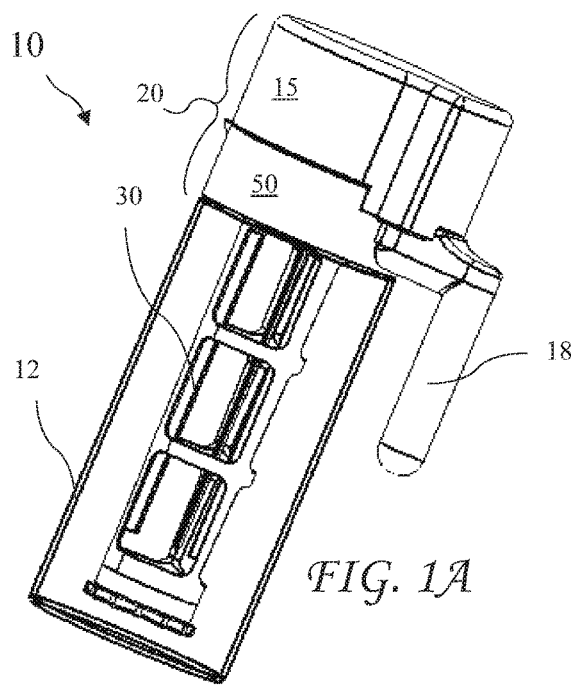
FIG. 1A shows a side view of an exemplary beverage brewing device according to the invention.
Figure 1B:
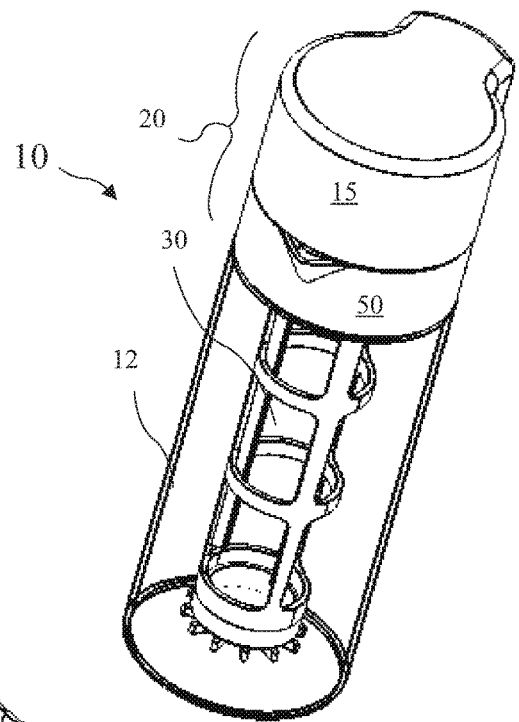
FIG. 1B shows an oblique view of an exemplary beverage brewing device according to the invention.
Figure 1C:
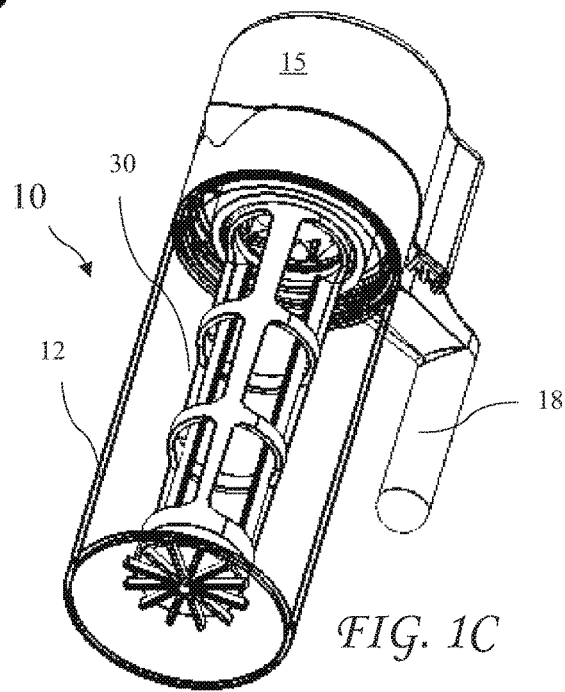
FIG. 1C shows an oblique view of an exemplary beverage brewing device according to the invention.
Figure 3B:
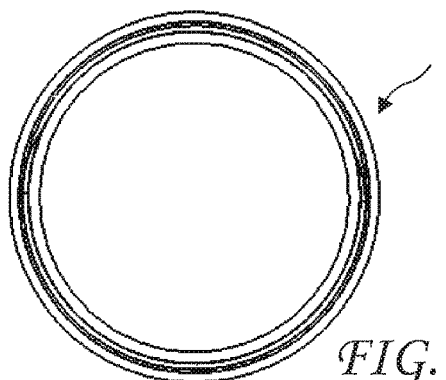
FIG. 3B shows a top view of an exemplary liquid container according to the invention.
Figure 3A:
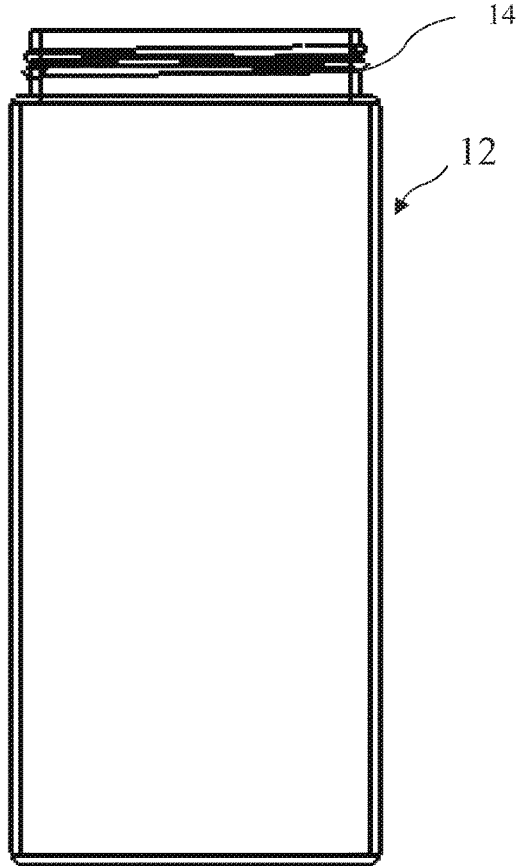
FIG. 3A shows a side view of an exemplary liquid container according to the invention.
Figure 2:
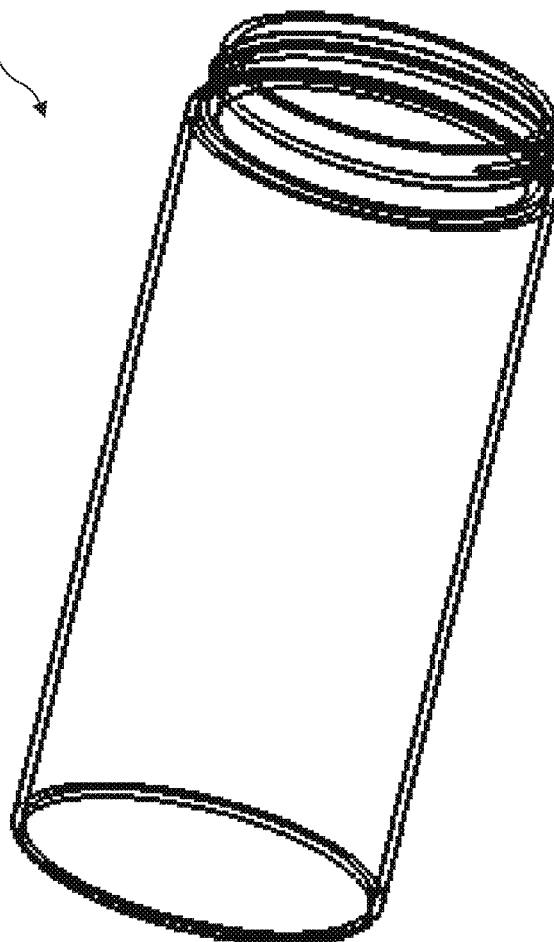
FIG. 2 shows an oblique view of an exemplary liquid container according to the invention.
Figure 3C:
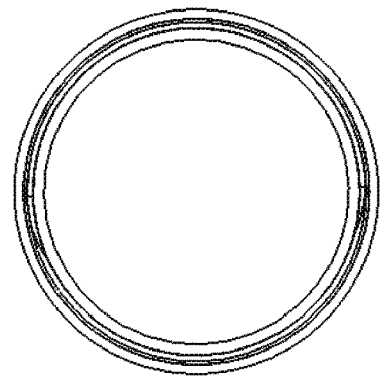
FIG. 3C shows a bottom view of an exemplary liquid container according to the invention.

Referring to FIGS. 1A-1C, a beverage brewing device 10 includes a container 12 configured to contain water or other liquid during brewing, having an open mouth on which a container collar 50 of a top assembly 20 can be placed. The container collar 50 can be removably coupled to the open mouth of the container 12 by any known coupling arrangement, such as by a friction fit or threaded screw-on coupling, or can be affixed to the open mouth of the container 12. The container 12 is preferably transparent to allow viewing the water in the container 12 as the water darkens while brewing progresses, but can be opaque or translucent in its entirety or in sections. A handle 18 can be attached to the top assembly 20 to provide ease of handling. As shown, a brewing material holder 30 is configured to be suspended from the top assembly 20.

Referring to FIGS. 2 and 3A-3C, the liquid container 12 is a vessel having a closed bottom and sidewall and an open mouth, and is made of any suitable material, such as glass or plastic. For example, the material of the container 12 can be transparent to allow viewing the water in the container 12 as the water darkens while brewing progresses, or can be an opaque or translucent material, with or without a transparent window or other indicator of the brewing progress. The exemplary container 12 shown in the drawings is generally cylindrical in shape, but the cross-section of the container 12 can be any regular or irregular shape, and can have a decorative exterior. The open mouth 14 can include threads 14 or any other cooperative feature configured to attach to the top assembly 20.

Figure 4:
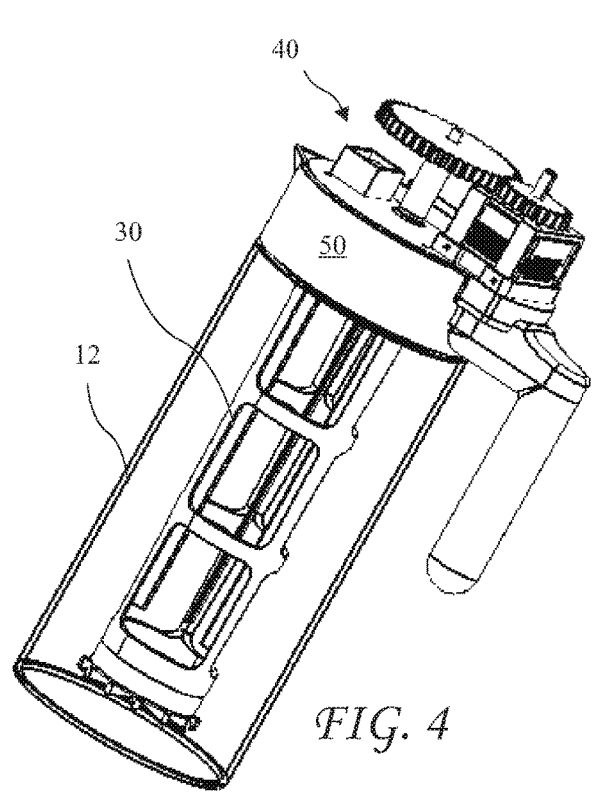
FIG. 4 shows a side view of an exemplary beverage brewing device according to the invention with a top assembly removed.

A side view of the beverage brewing device 10 with the lid cover 22 removed is shown in FIG. 4. A drive assembly 40 is mounted within the top assembly 20 above the container collar 50. The drive assembly 40 is configured to couple with the brewing material holder 30 and, when coupled and actuated, to rotate the brewing material holder 30.

Figure 5A:
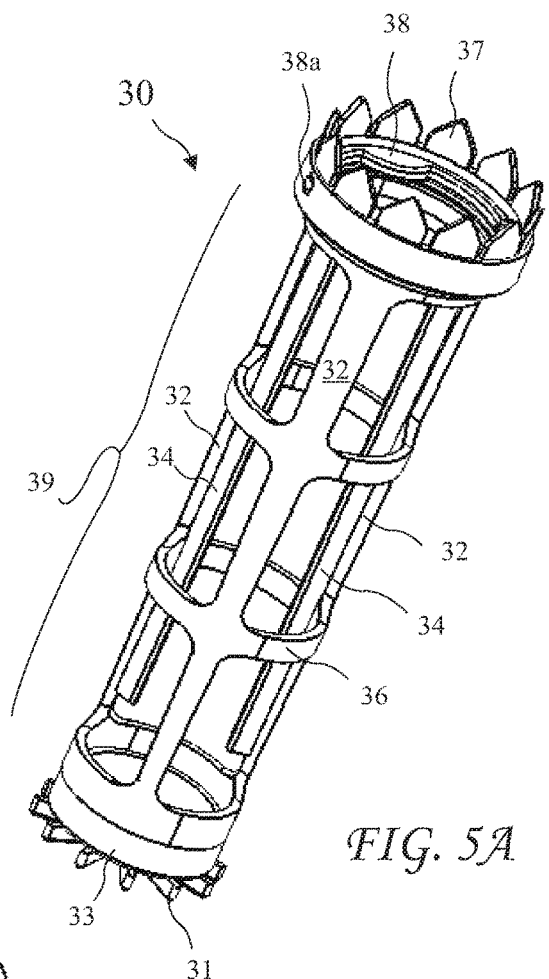
FIG. 5A shows an oblique view of an exemplary brewing material holder according to the invention.
Figure 5B:
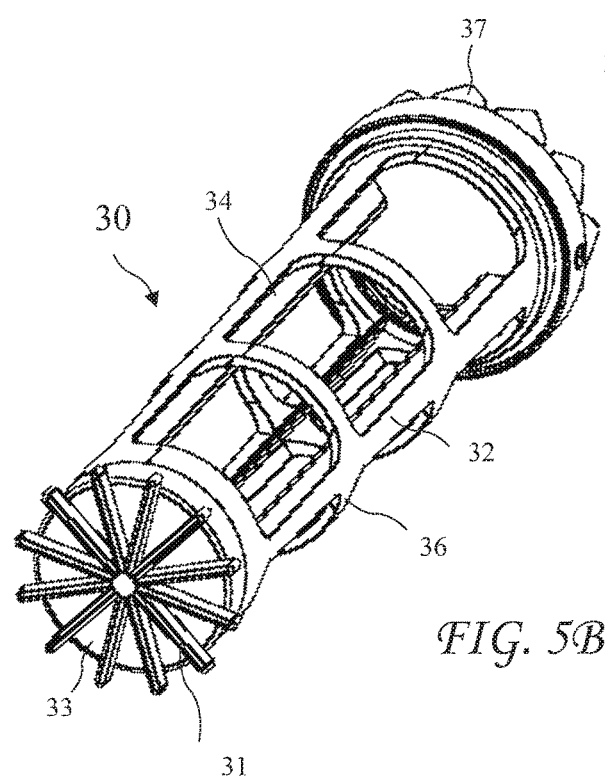
FIG. 5B shows an oblique view of an exemplary brewing material holder according to the invention.

With reference to FIGS. 5A and 5B, the brewing material holder 30 is configured to hold ground brewing material while allowing liquid to pass through the brewing material in order to brew the beverage. The brewing material holder 30 includes a frame 39 (see FIG. 6A). The exemplary brewing material holder 30 shown has vertical members 32 and circular members 36 that intersect to form the frame 39, but any configuration that is sturdy and also includes one or more open areas to allow liquid to pass through is suitable for use as the frame 39. The frame 39 can include an integrated closed bottom, or a bottom cap 33 can be coupled to the bottom of the frame 39, for example by press-fit coupling or by threaded coupling. The bottom cap 33 can include a solid bottom plate 35 to retain the brewing material within the brewing material holder 30, or can have an open area to allow liquid to pass through, covered in mesh to retain the brewing material.

In order to facilitate placement of the brewing material holder 30, one or more handles or grips can be arranged on the frame 39. For example, a holder handle 38 can be integrally formed as part of the frame 39, or can be attached, such as pivotally attached at the top of the brewing material holder 30 by pivots 38a. A user can lift the brewing material holder 30 from the container 12 by the handle.

As mentioned above, the drive assembly 40 is configured to couple with the brewing material holder 30 and can be used to rotate the brewing material holder 30 in order to provide agitation that can speed a cold-brewing process. Other features can be included to provide further agitation or turbulence as the brewing material holder 30 rotates. For example, fins 31 can be integrally formed on or attached to the bottom cap 33 as shown (or bottom of the brewing material holder 30 if a cap is not used), extending downward and/or outward to provide mixing to the water in the container 12 as brewing progresses. Similar fins can be included elsewhere on the outside of the brewing material holder 30 instead of or in addition to the bottom fins 31. Blades 34 or paddles can also be included that extend into the interior of the frame 39 to urge brewing material to mix within the brewing material holder 30. These blades can be of any size and can extend inward from any point at any angle.

Referring to FIGS. 6A-6D, cooperative elements are formed at or attached to the top of the frame 39, configured to cooperate with corresponding cooperative elements of the drive assembly 40 to transfer rotational motion from the drive assembly 40 to the brewing material holder 30. For example, as shown the holder cooperative elements can be triangular teeth 37 pointing away from the brewing material holder 30 in order to engage corresponding cooperative elements of the drive assembly 40 to rotationally couple the brewing material holder 30 to the drive assembly 40. The holder cooperative elements can take any configuration that will allow rotational coupling to the drive assembly 40.

An exemplary mesh element 30a of the brewing material holder 30 is shown in FIG. 7. As previously described, the frame 39 includes one or more open areas that allow liquid to flow through the brewing material holder 30. The mesh element 30a is configured to keep ground brewing material 30b within the brewing material holder 30 while still allowing the liquid to pass through. The exemplary mesh covering 30a is attached around the inside of the frame 39 of the brewing material holder 30, covering the open areas in the frame 39. Examples of suitable mesh materials are nylon mesh, for example fine nylon mesh (for example, 75 micron opening or other suitable size), metal mesh material, and paper mesh material or filter paper. Those skilled in the art will recognize that other mesh material of suitable size and material can be used, and any such other mesh material is contemplated for use within the scope of the invention. Further, in place of the single-piece mesh element shown, each individual opening in the frame 39 can be covered by an individual attached mesh panel, or any number of mesh panels can be used to cover one or more openings. If more than one mesh panel is used, different mesh material, such as mesh material having different-sized openings, can be used advantageously to affect the flow pattern of the liquid through the brewing material holder 30. Thus, any embodiment of a brewing material holder 30 that includes openings covered by panels that allow liquid to flow through while retaining ground brewing material 30b within is included within the scope of the invention.

Figure 8A:
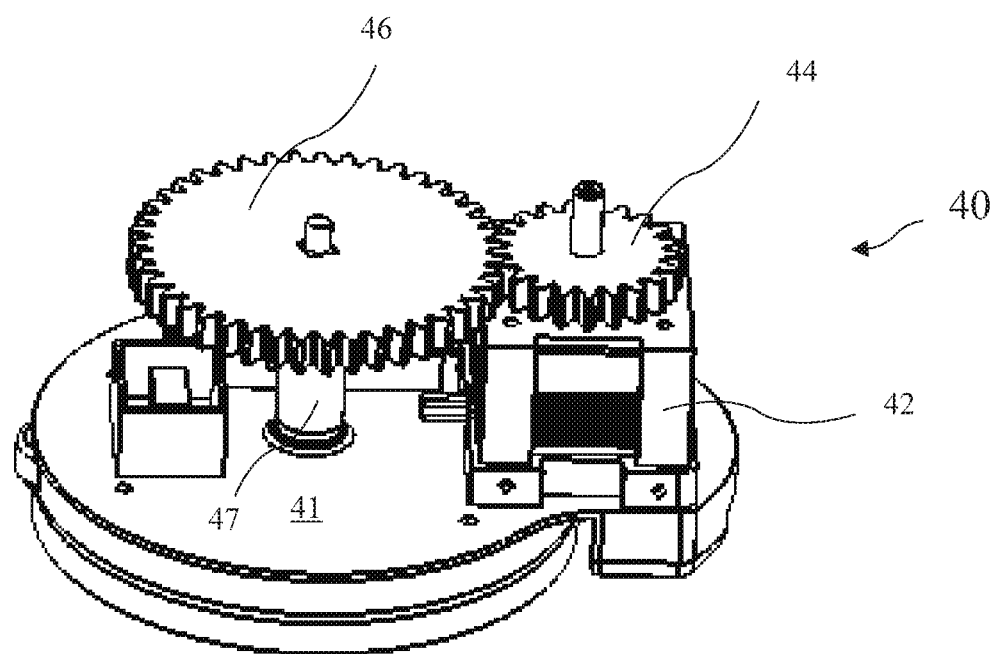
FIG. 8A shows an oblique view of an exemplary drive assembly according to the invention.
Figure 8B:
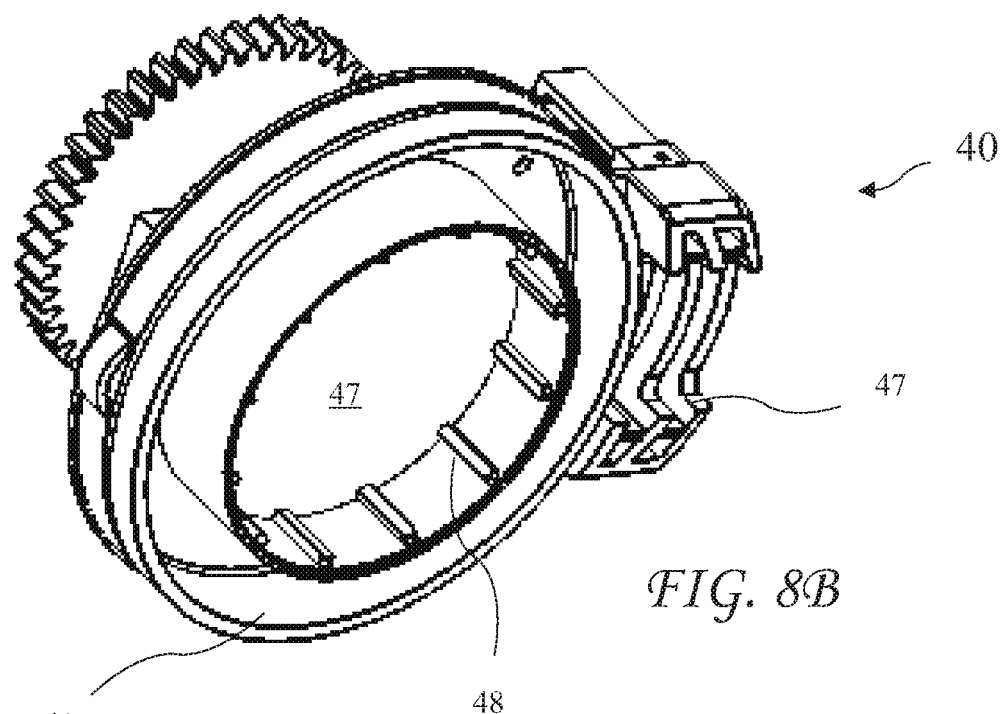
FIG. 8B shows an oblique view of an exemplary drive assembly according to the invention.
Figure 9A:
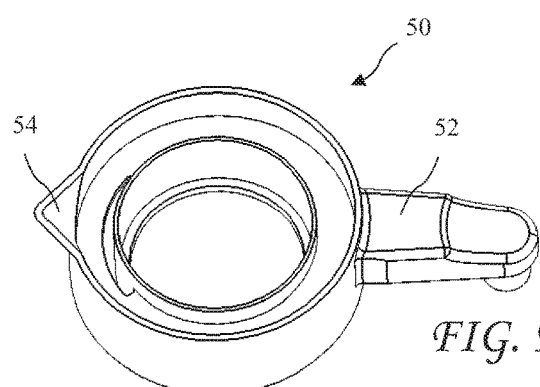
FIG. 9A shows an oblique view of an exemplary container collar according to the invention.
Figure 9B:
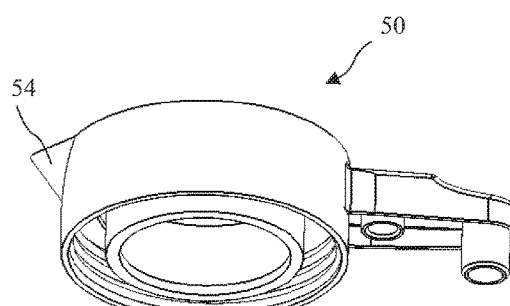
FIG. 9B shows an oblique view of an exemplary container collar according to the invention.
Figure 9C:
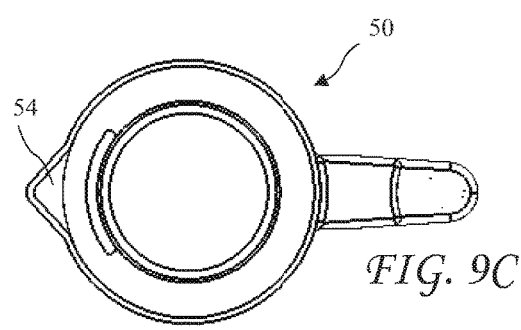
FIG. 9C shows a top plan view of an exemplary container collar according to the invention.
Figure 10:
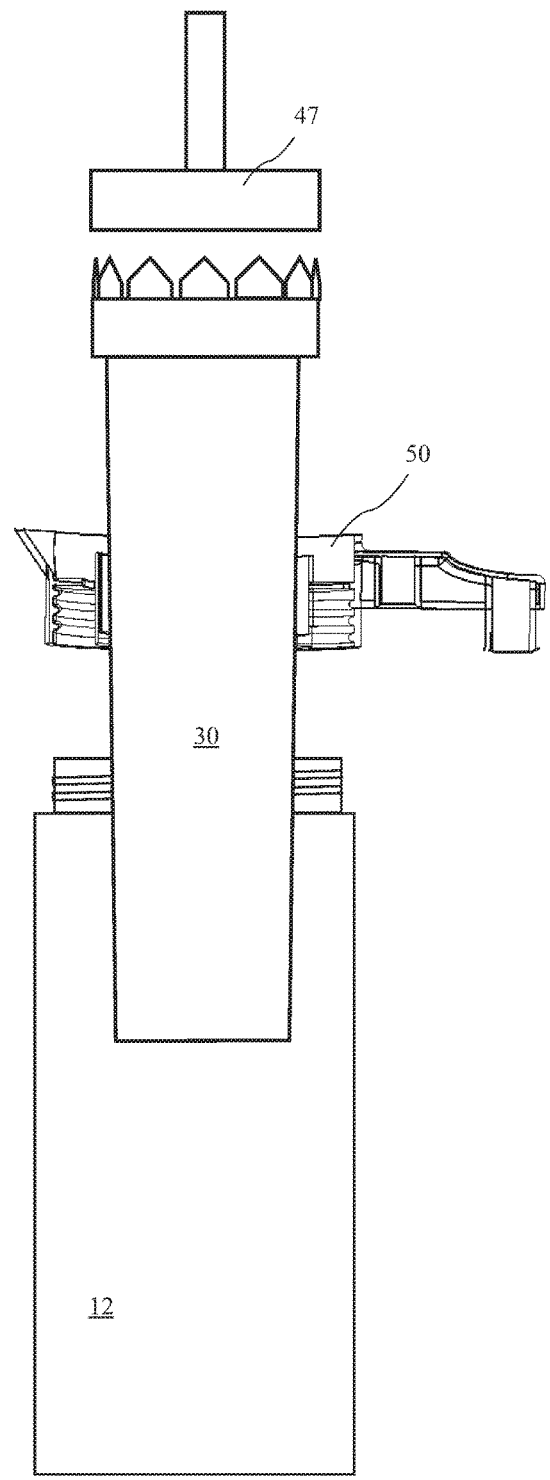
FIG. 10 shows an exploded view of exemplary elements of an exemplary beverage brewing device according to the invention.

Referring to FIGS. 8A and 8B, the drive assembly 40 is configured to be arranged above the container collar 50, as shown in FIG. 4. For example, the drive assembly 40 can include lips 47 that straddle a handle support 52 of the container collar 50 (see FIG. 9A) to fix the position of the drive assembly 40 in place for use, but allowing the drive assembly to be lifted easily off of the container collar 50. Drive for rotation of the brewing material holder 30 is preferably provided by an electric motor 42, for example through reduction gears 44 and 46, to drive cooperative elements that engage the cooperative elements of the brewing material holder 30. The motor can be powered by one or more batteries, a hand crank, a solar device, AC power, a spring force, or any other source of energy. Any type of motor providing a rotational movement to drive the brewing material holder 30 can be used, and the motion can be transferred by a belt drive or any other mechanism, such that the reduction gears 44 and 46 might not be needed, or other gearing can be used.

For example, the drive assembly 40 can include a drive coupler 47 rotationally coupling the gear 46 to cooperative elements such as vertical bars 48 extending outward to engage the triangular teeth 37 (see FIGS. 6A, 6B) or other cooperative elements of the brewing material holder 30 to rotationally couple the brewing material holder 30 to the drive assembly 40. The reduction gears 44 and 46 adjust the rotational speed of the brewing material holder 30 as desired to impart the proper rotational movement to the brewing material holder 30. Preferably, the speed and direction of the rotational drive provided by the drive assembly 40 can be adjusted to suit the brewing application. For example, the drive assembly can provide continuous rotation in one direction only, at a constant or varying speed, such as between about 30 and 90 cycles per minute, or the rotational motion can be a reversing oscillation, such as between 90 degrees and 270 degrees. Preferably, the speed, direction, and range are selectable by a user.

Referring to FIGS. 9A-9C and 10, the container collar 50 engages the container 12 for brewing and pouring. For example, the container collar 50 can include a central opening having a lip extending into the opening. The brewing material holder 30 can slide down through the opening in the container collar 50 until it abuts the lip. When the container collar 50 is placed on the open mouth of the container 12, the lip supports the brewing material holder as the lower portion of the brewing material holder 30 is suspended within the container 12, held up by the container collar 50. The drive coupler 47 engages the brewing material holder 30 when the drive assembly 40 is placed onto the container collar 50, to provide rotation of the brewing material holder 30 during brewing. The container collar 50 can include a spout 54 that facilitates pouring the brewed beverage from the container 12 after the drive assembly 40 and top assembly 20 are lifted away.

Figure 11A:
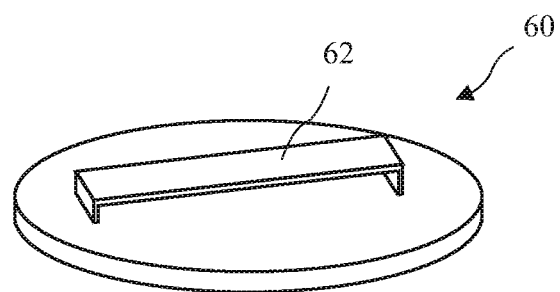
FIG. 11A shows a top oblique view of an exemplary pouring lid according to the invention.
Figure 11B:
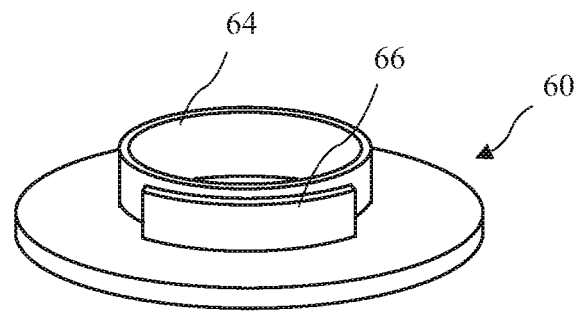
FIG. 11B shows a bottom oblique view of an exemplary pouring lid according to the invention.

Referring to FIGS. 11A and 11B, the beverage brewing device 10 can include a pouring lid 60. The pouring lid 60 replaces the drive assembly 40 after the beverage has been brewed, and the container 12 is used to store and serve the brewed beverage. The pouring lid 60 preferably includes a lid handle 62 that is configured to be grasped by a user to remove the pouring lid 60. The pouring lid 60 can include a spout guard 66. Once in place, the pouring lid 60 can be rotated to move the spout guard away from the spout 54 to allow pouring of the beverage, and to align the spout guard 66 with the spout 54 to prevent spillage (see FIGS. 9A-9C).

Thus, the beverage brewing device of the invention can be used to brew a beverage such as coffee, tea, or an herbal infusion, from brewing material such as ground coffee beans, shredded tea leaves, ground or shredded herbs, root shavings, or any other material from which a beverage can be brewed. To brew a beverage, the container is filled with hot or cold water, in order to hot- or cold-brew the beverage. Brewing material is placed in the brewing material holder, in an amount desired for the intended beverage strength. The brewing material holder is suspended in the liquid in the container, supported at an upper end by the container collar, and in time the beverage is brewed by liquid in contact with the brewing material. If rotation is desired in order to speed the brewing process, a drive assembly can be arranged to couple with the brewing material holder. When the drive assembly is actuated, the brewing material holder is rotated or otherwise agitated by the drive assembly, increasing the flow and/or turbulence of the liquid brewing the beverage in order to speed the brewing process. Once the beverage is brewed, the drive assembly can be uncoupled from the brewing material holder and removed, and the brewing material holder can be lifted out of the container, drained, and removed. The pouring lid can then be coupled to the container collar in place of the drive assembly.

In general, the beverage brewer includes a container collar, a brewing material holder, a mesh element, and a drive assembly. The beverage brewer can be configured to be used with an existing container, or can include the container, which serves as the vessel in which the beverage is brewed as well as the vessel in which the brewed beverage is stored and served, and has an open top, a closed sidewall, and a closed bottom. Brewing the beverage in the storage and serving container simplifies the process, cuts down on the counter space needed for brewing, and makes clean-up easier. The container can be made, for example, from a transparent material, such as glass or plastic, so that a brew strength of the brewing or brewed beverage can be observed easily. Lines and markings can be applied to the container to indicate, for example, volume levels of liquid in the container.

The container collar is configured to cover the rim of the open top, providing a surface from which to suspend the brewing material holder and on which to support the drive assembly, and preferably providing a spout to facilitate pouring of the beverage after brewing. As shown and described, it provides a stable outer surface and an inner opening through which the brewing material holder can be lowered into the container and brewed beverage can be poured out of the container.

The brewing material holder is configured to hold brewing material, such as ground brewing material, and to be suspended from the container collar and into an interior of the container. The brewing material holder includes a sidewall having one or more openings, an open top, and a bottom. The sidewall can have any cross-sectional shape, but preferably terminates in an open top that is round, to facilitate rotation of the brewing material holder about a longitudinal axis. For example, the cross-section of the sidewall can be polygonal and abruptly terminate in a round open top, or can be polygonal for the most part, gradually rounding out toward the circular top. The internal shape of the sidewall can be selected to produce the most advantageous fluid motion within the brewing material holder, based on the rotational movement, direction, and speed of the holder provided by the drive assembly.

The brewing material holder sidewall can be a solid surface, with the one or more openings cut from the solid sidewall. Alternatively, for example, the sidewall can be a frame made of frame elements that connect and leave openings between the elements. For example, the sidewall can have a circular cross-section and can include a frame having longitudinal members and connecting circumferential members, leaving openings in the spaces between the frame members. To further influence movement of the liquid and brewing material within the brewing material holder during the brewing process, the brewing material holder can include implements within and on the outside of the sidewall to direct fluid flow and/or to increase turbulence. For example, one or more blades, such as paddle blades, can be attached to or integrally formed with the sidewall, projecting inward from an inner surface of the sidewall within an interior of the brewing material holder. Each blade can take any size and shape beneficial to directing the flow of liquid as desired. Alternatively, or in addition, the brewing material holder can include one or more fins, each extending outward from an exterior surface of the sidewall. For example, the fins can extend outward from an exterior surface of a bottom end of the sidewall.

A mesh element covers each opening in the sidewall of the brewing material holder. The number, locations, and sizes of the openings can be selected for advantageous flow of brewing liquid through the sidewall and therefore through the brewing material held in the brewing material holder. A single mesh-covered opening can be used, or several strategically-placed mesh-covered openings can be present to direct liquid flow through and within the brewing material holder. The sizes of the openings can be uniform or varied, as can the material and mesh size of the mesh elements. Alternatively, a single mesh tube can be inserted into the brewing material holder and attached to the inner surface of the brewing material holder, of a size large enough to cover the opening or all the multiple openings. Regardless of the form of the one or more mesh elements, each can be constructed from any material that can withstand the fluid dynamics of the beverage brewer in operation. For example, the material can be any nylon mesh, metal mesh, paper mesh, and/or filter paper having openings of a suitable size to contain the ground brewing material.

The drive assembly is positionable on the container collar and is configured to be mechanically coupled to and rotate the brewing material holder. For example, the various components of the drive assembly can be affixed to a platform or other base element, which in turn can be configured to couple to or rest on the upper portion of the container collar. The drive assembly can couple with the container collar in any manner, such as by friction-fit or snap-fit, or can sit on the collar, preferably keyed to a stable position so as to remain stationary during use. Alternatively, the drive assembly base can be attached to the container collar by a hinge, allowing the drive assembly to be pivoted into place when needed for a brewing process, and pivoted away from the container collar when brewing is finished or when the brewing material holder is inserted into the container through the container collar.

The open top of the brewing material holder preferably opens into the open top of the container through the container collar when the brewing material holder is suspended from the container collar into the interior of the container. That is, the container collar preferably has an annular shape, and is arranged on the rim of the open top of the container. The brewing material holder is lowered, bottom end first, through the central opening in the container collar and into the container until an outward projection at the top of the brewing material holder abuts an inward projection in the central opening of the container collar. The brewing material holder is thus held in place in a manner in which it can be rotated about its longitudinal axis while the lower portion is suspended within the container. Looking from above, the open top of the brewing material holder now opens into the open top of the container through the container collar. Arranged in this way, brewing material can be added to the interior of the brewing material holder after the brewing material holder is in place, if desired. Thus, hot or cold water can be added to the container before putting the brewing material holder in place in the container collar, or the brewing material holder can be put in place first, and then hot or cold water can be poured into the brewing material holder and over the brewing material, filling the container through the mesh elements covering the openings in the brewing material holder.

During the brewing process, fluid motion within the brewing material holder might be directed upward at least partially and temporarily, and suspended pieces of ground brewing material could be present at any location along the length of the brewing material holder, from the bottom to the open top. Therefore, when the drive assembly is positioned on the container collar for brewing, it preferably will cover the open top of the brewing material holder so as to prevent spillage during the brewing process. Thus, the drive assembly platform or other base element preferably takes the general shape of the open top of the brewing material holder. When the drive assembly is positioned on the container collar for brewing, it also couples with the brewing material holder so that the rotation provided by the motor can be transferred to the holder. To this end, the brewing material holder can include first cooperative elements, and the drive assembly can include second cooperative elements configured to align and engage the first cooperative elements to mechanically couple the drive assembly to the brewing material holder. For example, the first cooperative elements can include teeth, and the second cooperative elements can include a corresponding coupler having spaced bars configured to align and engage the teeth to mechanically couple the drive assembly to the brewing material holder. The teeth can be, for example, generally triangular in shape. Any type of coupling arrangement and cooperative element design is contemplated for use by the invention.

The bottom of the brewing material holder can have a closed surface, so as to prevent any liquid from passing through the bottom end of the holder. The bottom of the brewing material holder can be integrated into the frame of the brewing material holder, attached to other frame elements. Alternatively, for example, the bottom of the brewing material holder can be a bottom cap having a closed surface and configured to be removably coupled to a bottom of the sidewall of the brewing material holder, such as by screwing on or snapping into place at the bottom of the holder frame. The bottom cap can include fins on the outer surface, as described above. Regardless of whether the brewing material holder bottom is integrated into the frame or removable, it need not have a completely closed surface, and instead can include one or more openings, each covered by a mesh element.

The drive assembly can include an electric motor of any type as the driving force for the assembly, and can be powered by an on-board battery, a fuel cell, a small solar panel mounted on the top assembly, or via an external AC or battery source. The drive assembly can include reduction gears if necessary or any other arrangement used to transfer the appropriate amount of output from the motor to the brewing material holder. A spring-wound motor, hand-cranked motor, or any other type of motor can be used instead of an electric motor, as would be apparent to those of skill in the art, or motion can be controlled by a hand crank or wound spring or other biased element with no motor at all. Controls for the motor can be provided by control circuitry and can be made available to the user via a user interface that can include a panel or individual buttons or knobs arranged on the top assembly or elsewhere. These controls can include an actuation control to turn the motor on and off, or actuation can be controlled automatically, for example, by pivoting the drive assembly into place above the brewing material holder and completing an interlock connection. The motor can be simple in function, causing rotation in one direction at a single speed, or the speed can be controllable by the user, in steps or continuously variable. The drive assembly can be configured to rotate the brewing material holder in either direction, or in both directions in a sequential pattern, such that the brewing material holder oscillates back and forth. The speed of rotation should be great enough to agitate the brewing material in the liquid within the brewing material holder, so as to speed the brewing process, but not so great as to induce centrifugal force that would push and hold the brewing material against the inner sidewall of the brewing material holder. All of these variables are preferably made selectable by the user via the user interface. Thus, in some embodiments the user can select the direction, speed, extent, and duration of the motion in any combination.

Further, the drive assembly need not cause the brewing material holder to rotate about a static axis. The drive assembly can be coupled to the brewing material holder on a movable spindle connected to a cam, for example, such that the rotational axis moves within the container, laterally and/or at an angle, affecting the fluid dynamics of the brewing process. Alternatively, the drive assembly can be configured to make the brewing material holder jitter or otherwise move erratically, or to simply move back and forth, laterally or in the motion of a pendulum, or in an eccentric pattern. Any coupling between the drive assembly and brewing material holder that can be used to achieve the desired motion of the brewing material holder is contemplated for use with the beverage brewer of the invention. Likewise, the inner lip of the container collar on which the brewing material holder is supported, and the surface of the brewing material holder that rests on the container collar, can be shaped to assist in providing the desired motion, such as by being curved radially or circumferentially to provide support for the motion. One or more bearings or other elements can be arranged at the interface between the container collar and the brewing material holder in order to reduce friction and wear.

Thus, the beverage brewer of the invention includes container means for holding liquid, collar means for covering a rim of the container means, holding means for holding ground brewing material and for being suspended from the collar means and into an interior of the container means, mesh means for covering an opening in the sidewall of the holding means, and drive means for mechanically coupling to and rotating the holding means, positionable on the collar means. The beverage brewer as contemplated by the inventor is not limited to any particular disclosed means, and instead encompasses any such means known or unknown to those of skill in the art, as arranged and configured in this disclosure.

The present invention has been described by way of example and in terms of preferred embodiments. However, the present invention as contemplated by the inventor is not strictly limited to the particularly disclosed embodiments. To the contrary, various modifications, as well as similar arrangements, are included within the spirit and scope of the present invention. The scope of the appended claims, therefore, should be accorded the broadest reasonable interpretation so as to encompass all such modifications and similar arrangements.

I claim:

1. A beverage brewer, comprising:
a container collar configured to be arranged on a rim of an open top of a container;
a brewing material holder configured to hold brewing material and to be suspended from the container collar such that the brewing material holder opens through the container collar, wherein the brewing material holder includes;
a sidewall having an opening,
a mesh element covering the opening,
an open top, and
a bottom; and
a drive assembly positionable on the container collar and configured to be mechanically coupled to and impart movement to the brewing material holder.

2. The beverage brewer of claim 1, further comprising a container configured to hold liquid, having an open top, a closed sidewall, and a closed bottom;
wherein the brewing material holder is configured to be suspended from the container collar and into an interior of the container such that the brewing material holder opens into the open top of the container through the container collar.

3. The beverage brewer of claim 1, wherein the drive assembly includes an electric motor.

4. The beverage brewer of claim 3, wherein the drive assembly includes reduction gears.

5. The beverage brewer of claim 1, wherein the drive assembly is configured to agitate the brewing material holder.

6. The beverage brewer of claim 1, wherein the drive assembly is configured to rotate the brewing material holder about an axis.

7. The beverage brewer of claim 1, wherein the drive assembly is configured to oscillate the brewing material holder.

8. The beverage brewer of claim 1, wherein the brewing material holder includes first cooperative elements, and
wherein the drive assembly includes second cooperative elements configured to align and engage the first cooperative elements to mechanically couple the drive assembly to the brewing material holder.

9. The beverage brewer of claim 8, wherein the first cooperative elements include one of teeth and spaced bars, and
wherein the second cooperative elements include a corresponding coupler having another of spaced bars and teeth configured to align and engage the one of teeth and spaced bars to mechanically couple the drive assembly to the brewing material holder.

10. The beverage brewer of claim 9, wherein the teeth are generally triangular in shape.

11. The beverage brewer of claim 1, wherein the mesh element is constructed from a material that is selected from the group consisting of nylon mesh, metal mesh, paper mesh, and filter paper.

12. The beverage brewer of claim 1, wherein the brewing material holder sidewall has a circular cross-section and includes a frame having longitudinal members and connecting circumferential members.

13. The beverage brewer of claim 1, wherein the mesh element is a first mesh element, and the brewing material holder bottom includes an opening covered by a second mesh element.

14. The beverage brewer of claim 1, wherein the bottom of the brewing material holder has an entirely closed surface.

15. The beverage brewer of claim 1, wherein the bottom of the brewing material holder is a bottom cap having a closed surface and configured to be removably coupled to a bottom of the sidewall of the brewing material holder.

16. The beverage brewer of claim 1, wherein the brewing material holder includes a paddle blade projecting inward from an inner surface of the sidewall within an interior of the brewing material holder.

17. The beverage brewer of claim 1, wherein the brewing material holder includes a fin extending outward from an exterior surface of the sidewall.

18. The beverage brewer of claim 17, wherein the fin extends outward from an exterior surface of a bottom end of the sidewall.

19. The beverage brewer of claim 1, further comprising control circuitry configured to control the drive assembly to provide selectable movement to the brewing material holder.

20. The beverage brewer of claim 19, further comprising a user interface configured to allow user input to the control circuitry.

21. The beverage brewer of claim 1, wherein the brewing material holder is configured to receive the brewing material while suspended from the container collar.

22. The beverage brewer of claim 1, wherein the brewing material holder is configured to be suspended from the container collar such that an outer periphery of the open top of the brewing material holder engages an outer periphery of a central opening of the container collar.

23. The beverage brewer of claim 22, wherein
the container collar includes a lip extending into the central opening; and
the brewing material holder is configured to abut the lip so as to be suspended from the container collar.

24. The beverage brewer of claim 22, wherein the drive assembly is positionable on the container collar to cover the open top of the brewing material holder.

25. A beverage brewer, comprising:
a container collar configured to be arranged on a rim of an open top of a container;
a brewing material holder configured to hold brewing material and to be suspended from the container collar such that the brewing material holder opens through the container collar, wherein the brewing material holder includes:
a perforated sidewall,
an open top, and
a bottom; and
a drive assembly configured to couple with and impart movement to at least a portion of the brewing material holder, wherein the at least a portion of the brewing material holder is configured to agitate liquid held in the container.

26. The beverage brewer of claim 25, further comprising a container configured to hold liquid, having an open top, a closed sidewall, and a closed bottom;
wherein the brewing material holder is configured to be suspended from the container collar and into an interior of the container such that the brewing material holder opens into the open top of the container through the container collar.

27. The beverage brewer of claim 25, wherein the drive assembly is configured to rotate the at least a portion of the brewing material holder about an axis.

28. The beverage brewer of claim 25, wherein the bottom of the brewing material holder is a bottom cap configured to be removably coupled to a bottom of the sidewall of the brewing material holder.

29. The beverage brewer of claim 25, wherein the bottom of the brewing material holder includes a fin projecting inward from an inner surface of the sidewall within an interior of the brewing material holder.

30. The beverage brewer of claim 25, wherein the fin is configured to agitate liquid held in the container when the drive assembly imparts movement to the at least a portion of the brewing material holder.

31. A beverage brewer, comprising:
a container configured to receive and hold liquid, having an open top, a closed sidewall, and a closed bottom;
a container lid configured to be arranged on a rim of the open top of the container;
a filter element configured to be suspended from the container lid;
a fin assembly; and
a drive assembly configured to couple with the fin assembly by other than a shaft and operable to rotate the fin assembly, thereby causing the fin assembly to agitate liquid held in the container.

32. A beverage brewer, comprising:
a container configured to receive and hold liquid, having an open top, a closed sidewall, and a closed bottom;
a container collar configured to be arranged on a rim of the open top of the container;
a filter element configured to be suspended from the container collar;
a fin assembly; and
a drive assembly configured to couple with the fin assembly by other than a shaft and operable to rotate the fin assembly, thereby causing the fin assembly to agitate liquid held in the container.

33. The beverage brewer of claim 32, wherein the filter element is configured to be suspended from the container collar and into an interior of the container such that the filter element opens into the open top of the container through the container collar.

34. The beverage brewer of claim 32, wherein the filter element is configured to receive brewing material while suspended from the container collar.

35. The beverage brewer of claim 32, wherein the filter element is configured to be suspended from the container collar such that an outer periphery of an open top of the filter element engages a periphery of an opening of the container collar.

36. The beverage brewer of claim 35, wherein
the container collar includes a lip extending into the opening of the container collar; and
the filter element is configured to abut the lip so as to be suspended from the container collar.

37. The beverage brewer of claim 32, wherein the bottom of the filter element is a bottom cap configured to be removably coupled at a bottom of the filter element.

38. The beverage brewer of claim 37, wherein the fin assembly includes a fin extending outward from the bottom cap.

39. The beverage brewer of claim 32, further comprising a container lid, configured to cover an opening of the container collar.

40. The beverage brewer of claim 32, wherein the drive assembly includes an electric motor.

41. The beverage brewer of claim 32, further comprising control circuitry configured to control the drive assembly to provide selectable movement to the fin assembly.

42. The beverage brewer of claim 41, further comprising a user interface configured to allow user input to the control circuitry.

\* \* \* \* \*